No. 821,987. PATENTED MAY 29, 1906.
W. H. COLDWELL.
LAWN MOWER.
APPLICATION FILED DEC. 11, 1905.

3 SHEETS—SHEET 1.

WITNESSES:

INVENTOR
William H. Coldwell
BY
Attorneys

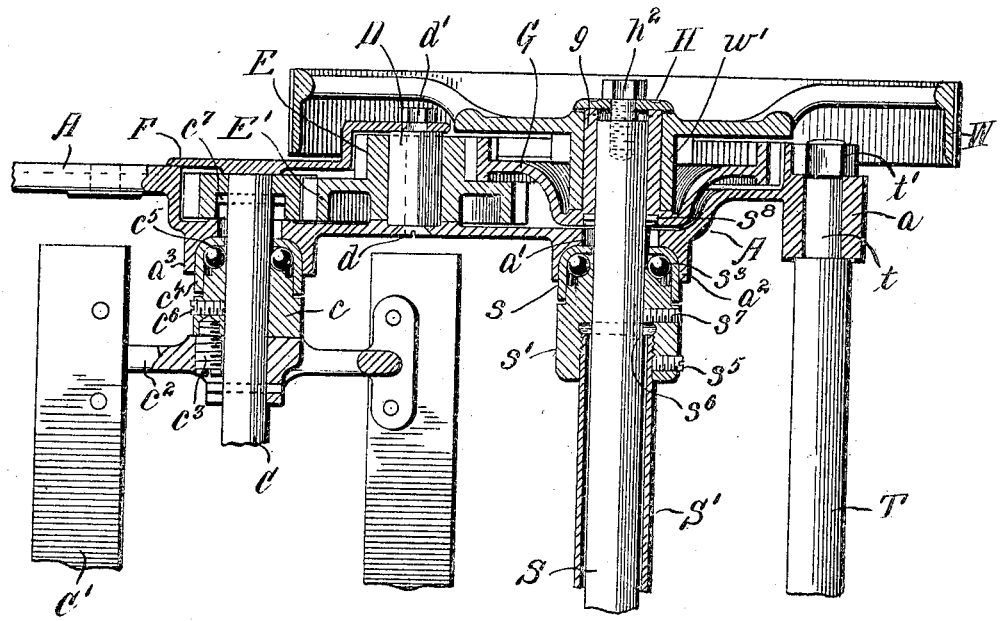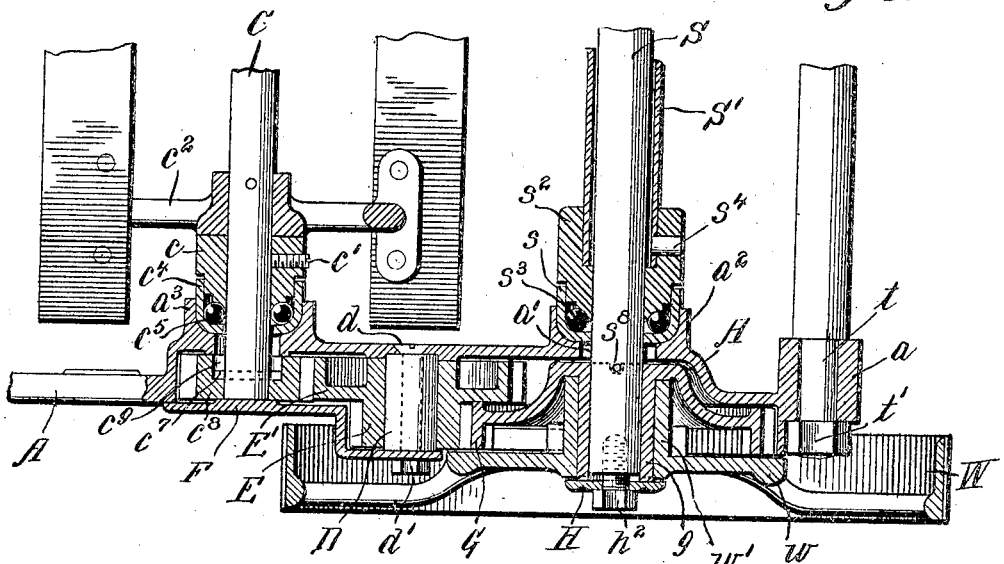

No. 821,987. PATENTED MAY 29, 1906.
W. H. COLDWELL.
LAWN MOWER.
APPLICATION FILED DEC. 11, 1905.
3 SHEETS—SHEET 3.
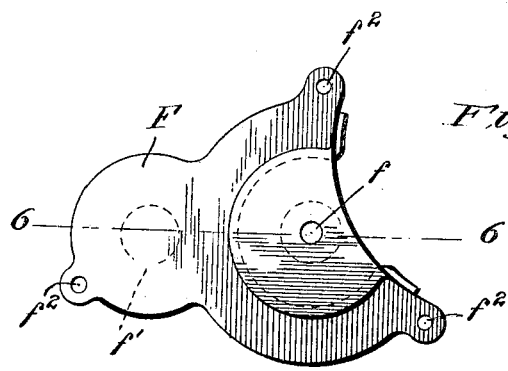
Fig.5.
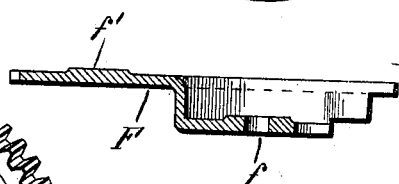
Fig.7. Fig.6.
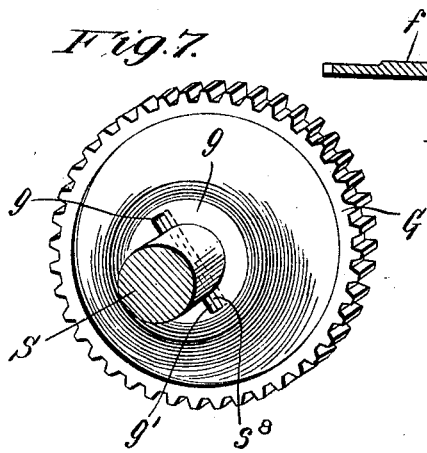
Fig.8.
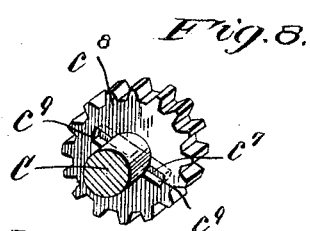
Fig.9.
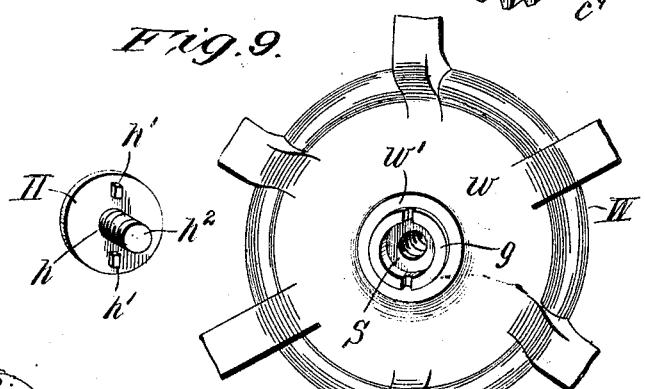
WITNESSES:
W. F. Roch.
O. H. Hubbard
INVENTOR
William H. Coldwell
By Whitaker Prevost
Attorneys

UNITED STATES PATENT OFFICE.

WILLIAM H. COLDWELL, OF NEWBURGH, NEW YORK.

LAWN-MOWER.

No. 821,987.  Specification of Letters Patent.  Patented May 29, 1906.

Application filed December 11, 1905. Serial No. 291,328.

*To all whom it may concern:*

Be it known that I, WILLIAM H. COLDWELL, a citizen of the United States, residing at Newburgh, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention is an improvement in lawn-mowers; and it consists in the novel features hereinafter described, reference being had to the accompanying drawings, which illustrate one form in which I have contemplated embodying my invention, and said invention is clearly and fully disclosed in the following description and claims.

Figure 1:
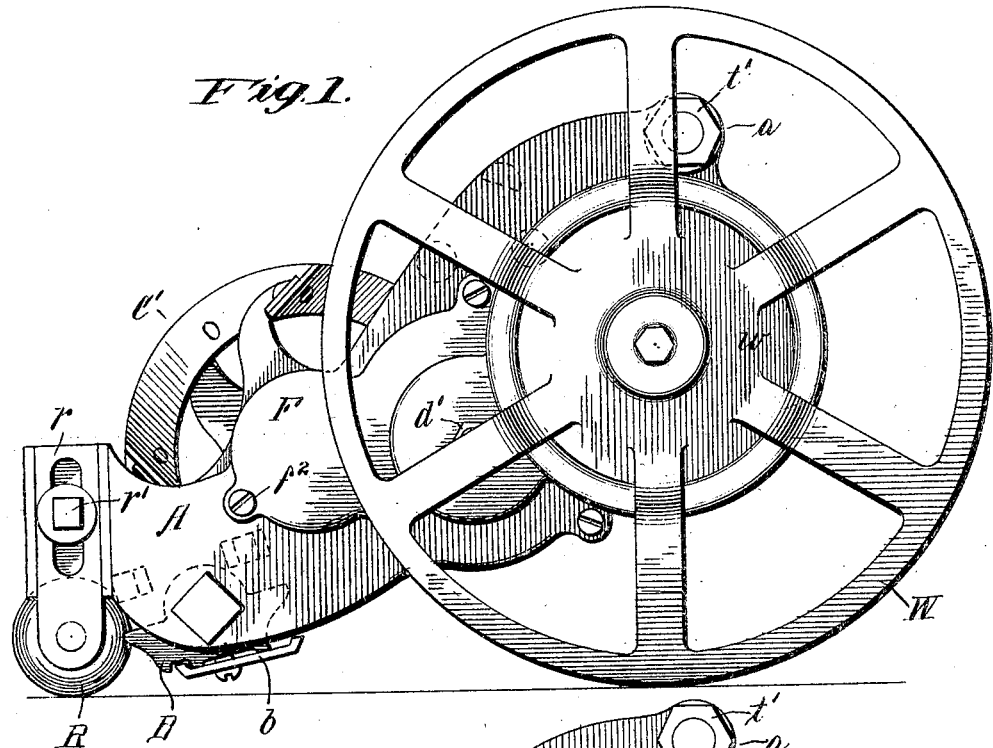
Figure 2:
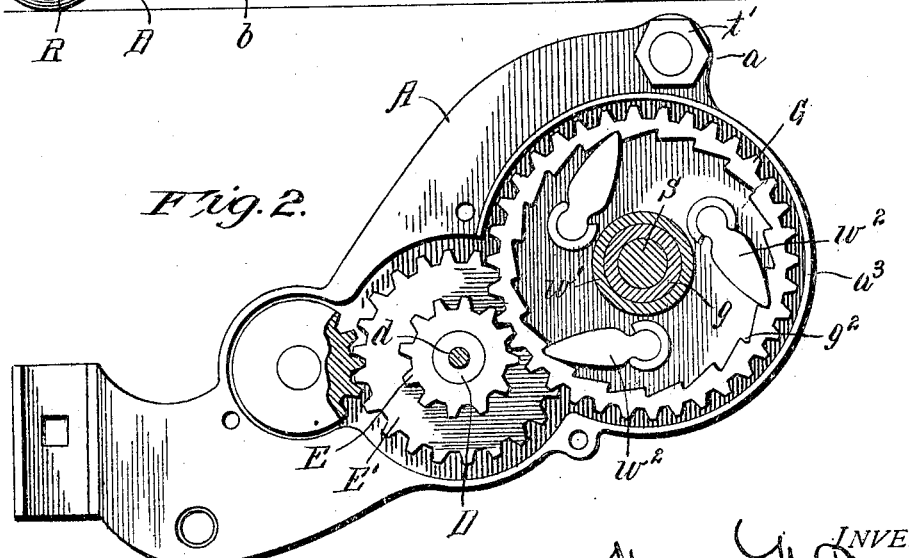

Referring to the said drawings, Figure 1 represents a side elevation of a lawn-mower embodying my invention, the handle for propelling the machine being removed. Fig. 2 represents one of the side frames of the mower, the driving-wheel and gear-casing being removed to show the train of gearing for driving the rotary cutter or wiper. Fig. 3 represents a horizontal section of the machine, the middle portion being broken away to allow the side portions to be shown in a larger scale. Fig. 4 is a detail view of a washer which is secured to the main driving-shaft or axle and the hub of the main driving-gear. Fig. 5 is an elevation of the gear-casing. Fig. 6 is a sectional view of same on line 5 5, Fig. 4. Fig. 7 is a perspective view of one of the main driving-gears, showing its connection with the main shaft. Fig. 8 is a similar view of one of the wiper-pinions, showing its connection with wiper-shaft. Fig. 9 is a perspective view showing means for retaining the drive-wheel on the shaft.

In the drawings, A A represent the two side frames of the machine, which are preferably formed of cast-iron, with provisions as hereinafter described for receiving the various parts of the mechanism. At the forward and upper extremity of each of said side frames a cored boss $a$ is formed, and the two side frames are connected at this point by a tie-rod T, having reduced portions $t$ extending through said cored bosses and provided outside of said bosses with threaded portions engaging nuts $t'$, which clamp said bosses between said nuts and shoulders formed by the reduced portion $t$, as will readily be seen in Fig. 3. Said side frames are also connected rigidly by the stationary knife-bar B, which carries the stationary knife $b$, said knife-bar being located adjacent to the rear end of the side frame, and thus forming therewith and with the tie-rod T a very rigid frame construction.

S represents the main driving shaft or axle of the machine, which extends through apertures $a'$ in the side frames of greater diameter than said shaft, said side frames being provided on their inner faces with means for receiving members of cone or ball bearings. In this instance I have shown these side frames provided with an inwardly-extending circular flange $a^2$, concentric with the aperture $a'$, before referred to, for receiving a steel cup $s$, having a ball-race formed therein, as shown. Upon the shaft S are mounted two cones $s'$ $s^2$, each provided with a ball-race, between which and the ball-race of one of the cups $s$ a suitable series of balls $s^3$ is inserted, as clearly shown in Fig. 3. The cones $s'$ and $s^2$ are fitted upon the shaft S so as to permit the longitudinal movement of the shaft through said cones and the adjustment of said cones with respect to the balls and cups of the two ball-bearings thus provided is effected by means of a sleeve S', having an internal diameter greater than the shaft S and surrounding the shaft without coming in contact therewith. This sleeve S' is rigidly attached to one of the cones before described and is adjustably connected to the other cone for the purpose of securing the desired adjustment of the two ball-bearings simultaneously. In the present instance I have shown the sleeve S' fitted into an annular recess in the cone $s^2$ and rigidly secured therein by means of a pin $s^4$. The opposite end of the sleeve S' is threaded exteriorly and is screwed into a threaded annular recess in the other cone $s'$, as shown in the drawings, Fig. 3, so that by holding the cone $s'$ stationary and rotating the sleeve S' and the other cone with respect thereto the distance between the two cones will be varied and they will be pressed farther into or withdrawn from the cups $s$, according to the direction in which the sleeve is turned, and by this means the accurate and simultaneous adjustment of the two ball-bearings may be secured. After this adjustment has been secured the parts may be locked in this position by means of a set-screw $s^5$, provided in the cone $s'$, engaging a radial threaded aperture therein and engaging the sleeve S'.

In order to cause the cones and the sleeve S' to rotate with the shaft S while permitting the longitudinal movement of the shaft, I provide the shaft S with a short keyway $s^6$ within the cone $s'$ and provide the cone $s'$ with a key in the form of a screw $s^7$, which passes through the cone and engages the keyway $s^6$. It will thus be seen that the end thrust of the shaft S will have no effect upon the bearings and that the shaft may be permitted at all times an endwise movement within the bearing in either direction.

At each end of the shaft and outside of the side frames is located a driving gear-wheel G, rigidly secured to the shaft. In the present instance I have shown each of these gear-wheels provided with a long hub $g$, which fits over the shaft and is also turned on the exterior. Each of the hubs $g$ is provided at its inner end with two recesses $g'$ $g'$, arranged opposite to each other, and the shaft S is provided adjacent to each end with a pin $s^8$, extending through the shaft and projecting on each side thereof. These pins are so located that when the gear-wheels G are slipped onto the ends of the shaft S the recesses $g'$ in the hubs will embrace the projecting portions of the pins and securely connect these gear-wheels G with the shaft, so that they will rotate therewith.

W W represent the ground-wheels or driving-wheels of the lawn-mower, which are preferably formed with a central plate $w$ of circular form, connected by suitable spokes with the rim of the wheel and provided with a central aperture and hub $w'$, which fits over the exterior of the hub $g$ of the gear-wheel G. The side frames A A are each provided with an external flange $a^3$, nearly annular in shape, as shown in Fig. 2, which, together with a recessed portion of the side frame, forms a casing for the gear-wheel, and the central side portion $w$ of the driving-wheels forms practically a cover for said casing, thus protecting the interior mechanism. The ground-wheels or driving-wheels W are connected to the driving gear-wheels G G through the intervention of pawl-and-ratchet mechanism. In this instance the interior face of the rim of each gear-wheel is provided with ratchet-teeth $g^2$, (see Fig. 2,) and a series of pawls $w^2$ are provided on the inner face of the central portion of the drive or ground wheels W to engage said teeth. It will thus be seen that when the mower is pushed forwardly in a direction to cause it to cut grass the pawls $w^2$ take into the ratchet-teeth $g^2$ in a well-known way and the drive-wheels W and driving gear-wheels G move together. When, however, the machine is drawn backward or when one of the drive-wheels W rotates more slowly than the other, as in making a turn, the hub of the driving-wheel is permitted to turn rearwardly on the hub of the gear-wheel.

D represents a bearing-stud provided on each of the side frames of the machine, upon which the intermediate pinions E E' are mounted. This stud is preferably formed separately from the side frame and provided with a longitudinal central aperture to receive a bolt $d$, which extends through the side frame and through the stud and is provided on its outer end with a nut $d'$. The intermediate pinions E E' are of different diameters for the purpose of giving the required speed to the wiper and are preferably formed in one piece and slipped over the studs D, as shown, the smaller pinion meshing with the driving gear-wheel G.

C represents the shaft of the rotary cutter or wiper C', said shaft being provided with the cones $c$, one of which is secured to the shaft by means of a set-screw $c'$ and the other cone being adjustable on said shaft. The rotary cutter or wiper comprises two spiders $c^2$, pinned to the shaft and carrying the blades of the cutter, and one of said spiders is provided with means for adjusting the other cone $c$, consisting of a double screw $c^3$, having portions of different diameter provided with right and left threads, one of said threads engaging the threaded aperture in the spider and the other engaging a threaded aperture in the cone, as shown in United States Letters Patent No. 669,436, March 5, 1901, granted to me and Harry T. Coldwell as joint inventors. Each of the side frames is provided adjacent to the wiper-shaft C with an annular flange $a^3$, which receives a steel cup $c^4$, provided with a ball-race, and balls $c^5$ are interposed between the said cup and the cones $c$ $c$. The adjustable cone $c$ is also provided with a set-screw $c^6$ for locking it positively in its adjusted position.

The wiper-shaft C is provided at each end with a pin $c^7$, extending through the same, and projecting on each side and at each end of the shaft a pinion $c^8$ is provided, having an aperture to fit the shaft and a recess at each side of said aperture, as shown at $c^9$, to fit over the ends of the pin $c^7$, so that the shaft C and said pinions will rotate together, and said pinions $c^8$ being in mesh with the larger pinion E' of the intermediate pinions the motion of the wheels W will thus be transmitted to the wiper-shaft and wiper.

The driving-wheels W and gear-wheels G are held in position upon the shaft S by means of washers H, one of which is shown in detail in Fig. 4. Each of these washers is provided with a central aperture $h$ and on its inner face with a pair of lugs $h'$ on opposite sides of the center and a little distance in from the periphery. These washers are applied to the outer ends of the hubs $g$ of the gear-wheels G, the lugs $h'$ fitting into recesses in the ends of the hubs, and screws $h^2$ are passed through the central apertures of the washers and screwed into a central threaded opening in the shaft S. The washers are larger than the hub in diameter, and the projecting portions serve to retain the driving-wheels W upon the hubs of the gear-wheels, while the washers themselves are prevented from rotating with respect to the shaft S, gear-wheels G, and screws $h^2$, so that there is no tendency for the washers to work loose.

F F represent a pair of small gear cases or shields, each of which is secured to one of the studs D and is constructed to incase portions of the intermediate pinions and also the wiper-pinions $c^8$, which are located in a recess formed in the side frames. Each of these gear-cases is preferably provided with an aperture $f$, which fits over the screw or bolt $d$ beneath the nut $d'$ of the device for securing the stud D in position, and each of said gear-cases has a flat portion which extends over the adjacent wiper-pinion and is preferably provided with a boss $f'$ on the inner side to engage the end of the pinion and prevent it from coming off the shaft. Each of said gear-cases is also provided with screw-holes $f^2 f^2 f^2$, by means of which it may be further secured to the side frame A.

R represents the rear supporting-roller of the machine, which is provided with slotted hangers $r$, secured to the frame by bolts $r'$, so as to be capable of vertical adjustment in the usual manner.

In the operation of this machine the endwise movement which is permitted to the main driving-shaft S, as before stated, will permit the driving-gears G to move slightly endwise, so as to prevent their jamming or straining, and the effect of this construction is to cause the gearing to run very smoothly and with very slight exertion of power in driving the rotary cutter.

In the operation of lawn-mowers where power is applied to the wiper-shaft from a driving-gear through intermediate gears it is found that when the bearings wear so as to become slightly loose, thus permitting lateral play of the shaft, there is a tendency of the gears to force themselves into closer mesh and bind, making the machine run very hard. It is to be noted that in my improved machine provision is made for the accurate adjustment of the bearings for the main drive-shaft and that the effect of adjusting these bearings, which are of the cone-ball variety, is to bring the driving-shaft to a perfect center of rotation, so that the gear-wheels G, if they had any tendency to bind in their mesh with the intermediate pinions E, would upon adjustment of the bearings be centered and drawn back from said pinions into the proper relation therewith. It will also be seen that the wiper-shaft of the machine is provided with adjustable bearings, the adjustment of which tends to center its shaft and prevent binding between the pinions $c^8$ and E'. In case the studs of the intermediate gears become worn they may be removed from the machine and new studs inserted, so that the proper relation of the driving gears and pinions of the trains can be maintained at all times. It is also to be noted that the side frames A, which are formed of cast-iron or other suitable metal, do not contain themselves any working parts or bearings which are subjected to wear and that all of the wearing parts carried by said side frames— to wit, the bearing-cups and the studs for the intermediate pinions—can be removed and replaced when they become worn. It therefore results that at any time when this lawn-mower constructed in accordance with my invention becomes sufficiently worn to make it necessary or desirable it can be supplied with new wearing parts at slight expense, and when so supplied it will be in exactly as good condition as when it was new.

The specific form of the bearings for the drive-shaft and adjusting means therefor shown herein is not claimed specifically herein, as it forms the subject-matter of another application filed by me, January 5, 1906, and given Serial No. 294,759.

What I claim, and desire to secure by Letters Patent, is—

1. In a lawn-mower, the combination with the side frames of a driving-shaft, ball-bearings for said shaft permitting the longitudinal movement of the shaft therethrough at all times, ground-wheels secured to said driving-shaft, a rotary cutter mounted in the side frames, and connections between the driving-shaft and the rotary cutter, substantially as described.

2. In a lawn-mower, the combination with the side frames provided with bearing members, of a driving-shaft extending loosely through said bearing members, and provided with bearing members mounted thereon to rotate therewith but permitting the longitudinal movement of the shaft therethrough at all times, a connection exterior to the shaft connecting the bearing members carried thereby, means for adjusting one of the said shaft-engaging bearing members with respect to said connection for simultaneously adjusting both of the shaft-bearings, ground-wheels secured to said shaft, a rotary cutter mounted in the side frames and connections between said driving-shaft and said rotary cutter, substantially as described.

3. In a lawn-mower, the combination with the side frames of bearing-cups supported thereby, a driving-shaft extending loosely through said bearing-cups and provided with bearing-cones connected to said shaft for rotation therewith, by devices permitting longitudinal movement of the shaft therethrough, a connection exterior to said shaft extending from one cone to the other, said cones and connection being provided with means for adjusting said cones toward and from each other, balls located between said cones and cups, ground-engaging wheels mounted on said driving-shaft, a rotary cutter mounted in the side frames, and gearing connecting said driving-shaft with said rotary cutter, substantially as described.

4. A lawn-mower having two side frames, non-rotatable bearing members for the driving-shaft, and non-rotatable bearing members for the cutter-shaft detachably secured therein, a driving-shaft extending loosely through its said non-rotatable bearing members, bearing members secured to rotate with said shaft, but permitting the endwise movement of the shaft therethrough, and coöperating with said non-rotatable bearing members, a rotary cutter provided with rotary bearing members coöperating with its said non-rotatable bearing members, a driving-pinion connected with said rotary cutter, a driving gear-wheel operatively connected with said driving-shaft, an intermediate pinion connecting said driving gear and pinion, and a stud supporting said intermediate pinion and detachably connected to one of said side frames, substantially as described.

5. In a lawn-mower, the combination with the side frames of a driving-shaft extending therethrough cup-shaped bearing members for said shaft carried by said side frames, conical bearing members carried by said shaft and connected to rotate therewith but permitting the longitudinal movement of the shaft therethrough, a driving gear-wheel operatively connected with said shaft, devices exterior to said shaft connecting said conical bearing members, for adjusting them with respect to their coöperating cup-shaped bearing members, a rotary cutter carried by said side frames, and arranged with its axis parallel to said driving-shaft, bearings comprising cup and cone members for said rotary cutter, a driving-pinion for said rotary cutter, an intermediate pinion arranged between said driving-gear and said pinion and provided with a stationary axis, and means for adjusting the bearings of said rotary cutter, substantially as described.

6. In a lawn-mower, the combination with the side frames, of a driving-shaft, bearings therefor comprising non-rotatable cup-shaped members, secured to said side frames, and cone-shaped members carried by said shaft but permitting it to move longitudinally therethrough, a driving gear-wheel mounted on said shaft and secured to rotate therewith, said gear-wheel being provided with an elongated hub, having an exterior bearing-surface, a ground-wheel mounted rotatably upon the exterior of said gear-wheel hub, a pawl-and-ratchet connection between said ground-wheel and said gear-wheel, a rotary cutter carried in the side frames, and connections between said gear-wheel and said rotary cutter, substantially as described.

7. In a lawn-mower, the combination with the main driving-shaft, of a driving gear-wheel mounted thereon and secured to rotate therewith, said gear-wheel being provided with an elongated hub, having an exterior bearing-surface, a ground-wheel provided with a hub engaging the exterior of the gear-wheel hub, a pawl-and-ratchet connection between said ground-wheel and gear-wheel, a retaining device secured to said gear-wheel hub and extending over the end of said ground-wheel hub, a rotary cutter and connections between said gear-wheel and rotary cutter, substantially as described.

8. In a lawn-mower, the combination with the main driving-shaft, of a driving gear-wheel mounted thereon and secured to rotate therewith, said gear-wheel being provided with an elongated hub, having an exterior bearing-surface, a ground-wheel provided with a hub, engaging the exterior of the gear-wheel hub, a pawl-and-ratchet connection between said ground-wheel and gear-wheel, a retaining-washer engaging the end of said gear-wheel hub, said parts being provided with interlocking portions, a screw connecting said washer to said shaft, a rotary cutter and connections between the rotary cutter and said gear-wheel, substantially as described.

9. In a lawn-mower, the combination with the driving-shaft provided adjacent to its end with projecting portions extending laterally therefrom, a driving gear-wheel having a hub provided with an exterior bearing portion, and with recessed portions to engage said projecting portions on said shaft, when the hub is slipped over said shaft, a ground-wheel having a hub mounted on the exterior of the gear-wheel hub, a pawl-and-ratchet connection between said ground-wheel and gear-wheel, a retaining device secured to the hub of said gear-wheel for securing the ground-wheel, the rotary cutter and connections between said driving gear-wheel and said rotary cutter, substantially as described.

10. In a lawn-mower, the combination with the side frames provided with bearing-cups on their inner sides, of a main driving-shaft extending through said side frames and provided with bearing-cones coöperating with said bearing-cups, a sleeve surrounding said shaft, extending from one of said cones to the other, and adjustably connected to one of said cones, a connection between said cones and said shaft causing them to rotate together but permitting the endwise movement of the shaft therethrough, a driving-gear secured to said shaft at each end and provided with elongated hubs having exterior bearing portions, ground-wheels mounted upon the hubs of said gear-wheels, ratchet-and-pawl connections between said ground-wheels and gear-wheels, a rotary cutter mounted in said side frames and provided with pinions, and gearing connecting said gear-wheels and said pinions, substantially as described.

11. In a lawn-mower, the combination with the side frames, provided with bearing-cups on their inner sides, of a main driving-shaft extending through said side frames and provided with bearing-cones coöperating with said bearing-cups, a sleeve surrounding said shaft, extending from one of said cones to the other, and adjustably connected to one of said cones, a connection between said cones and said shaft causing them to rotate together but permitting the endwise movement of the shaft therethrough, a driving-gear secured to said shaft at each end and provided with elongated hubs having exterior bearing portions, ground-wheels mounted upon the hubs of said gear-wheels, ratchet-and-pawl connections between said ground-wheels and gear-wheels, a rotary cutter mounted in said side frames and provided with pinions each having a recessed portion engaging projecting portions on the shaft of the rotary cutter, intermediate pinions connecting said cutter-pinions and said driving-gears, studs detachably secured to said frames and carrying said intermediate pinions, said side frames having a recessed portion inclosing said driving gear-wheels intermediate pinions and cutter-pinions, said ground-wheels having solid central portions forming closures for said recessed portions of the side frames, and detachable gear-casings for covering said intermediate pinions and cutter-pinions, substantially as described.

In testimony whereof I affix my signature in the presence of two witnesses.

WILLIAM H. COLDWELL.

Witnesses:
A. W. MAPES,
CHAS. K. COLDEN.